United States Patent [19]

Crooke et al.

[11] 3,872,290

[45] Mar. 18, 1975

[54] FINITE IMPULSE RESPONSE DIGITAL FILTER WITH REDUCED STORAGE

[75] Inventors: Arthur W. Crooke, Concord; Paul H. Schottler, Acton, both of Mass.

[73] Assignee: Sperry Rand Corporation, New York, N.Y.

[22] Filed: Sept. 24, 1973

[21] Appl. No.: 400,078

[52] U.S. Cl. .................................. 235/152, 235/181

[51] Int. Cl. ............................................ G06f 15/34

[58] Field of Search .................... 235/152, 156, 181; 328/167; 333/28 R, 70 T; 325/42

[56] References Cited

UNITED STATES PATENTS

| | | | |
|---|---|---|---|
| 3,482,190 | 12/1969 | Brenin | 333/28 X |
| 3,573,667 | 4/1971 | Kao et al. | 333/28 X |
| 3,651,316 | 3/1972 | Gibson | 235/152 |
| 3,758,863 | 9/1973 | Ungerboeck | 333/28 X |

*Primary Examiner*—Malcolm A. Morrison
*Assistant Examiner*—David H. Malzahn
*Attorney, Agent, or Firm*—Howard P. Terry

[57] ABSTRACT

An algorithm and instrumentation for a digital transversal filter utilizing a finite impulse response wherein storage is reduced by storing partial results of the convolution process for a number of output samples rather than storing input data.

6 Claims, 5 Drawing Figures

FINITE IMPULSE RESPONSE DIGITAL FILTER WITH REDUCED STORAGE

BACKGROUND OF THE INVENTION

1. Field of the Invention

The invention relates to digital filters of the type discussed in the article "On Digital Filtering" by C. M. Rader in the IEEE Transactions on Audio and Electro Acoustics, Vol. AU-16, number 6, September 1968, pages 303–314. The invention particularly relates to digital transversal filters in applications in which bandwidth reduction is accompanied by sample rate reduction.

2. Description of the Prior Art

Since the advent of sophisticated digital signal processing systems and the increasing miniaturization and increasing reliability of digital circuit components, the use of digital filters as replacements for traditional analog filters has become increasingly desirable. Digital filters may be implemented either with software on a general purpose digital computer or with special purpose digital hardware and generally operate upon a sequence of input numbers usually representative of the amplitudes of evenly spaced samples of the input waveform converted to the digital number representations. As the input waveform progresses in time the digital discrete time samples of the input signal are operated upon by the filter computation algorithm to provide corresponding digital discrete time output signals representative of the filtered input waveform. These filtered discrete time signals may then be utilized directly by the digital data processing system of which the filter is a part. The filter may provide an input into a more complex signal processor such as a fast Fourier transform, matched filter, or a high order band limiting filter.

Digital filters are generally of two types, i.e., recursive or non-recursive (transversal). In the recursive filter, linear combinations of past input samples as well as past output samples with the present input sample are utilized to provide the current output sample. In the transversal filter, only linear combinations of the present and past input samples are utilized to provide the current output sample. An important characteristic of transversal filters is the inherent phase linearity provided thereby.

One known computational implementation for linear phase transversal filters is to provide the output samples by obtaining the discrete convolution of the input samples with samples of the finite impulse response for the desired filter characteristics.

Because of the direct relation between input sampling frequency and the computation rate of most complex digital signal processors, an important consideration in system optimization is the minimization of this rate, consistent with tolerable limits on signal distortion such as aliasing and phase non-linearities. This requirement for sample rate reduction implies a need for bandwidth reduction prior to the final sampling process. While this band limiting, for analog inputs, is always at least partially accomplished, intentionally or otherwise, in the analog circuitry preceding the analog-to-digital converter, there are many situations where a digital filter is desirable following the converter to permit a second sampling process at a lower rate.

Digital filters are particularly desirable for input filtering in systems which must process signals from several sources with filters having different center frequencies and bandwidths. Even where such flexibility is not required, compensation for the phase distortions introduced by analog filters with sharp cutoff characteristics can be costly, if not impossible. Because of the importance of phase linearity in many applications, the use of linear phase finite-duration impulse response (FIR) transversal filters is particularly desirable. Such band limiting filters may be of the band pass, band stop, high-pass, low pass, etc., variety.

For filters of the type discussed, storage must be provided for the samples of the filter impulse response coefficients and also for the past input data samples with which the convolution is obtained to provide the output samples. Since the impulse response coefficients can be stored in read-only memories and time shared for filtering of a number of different signals, the input signal storage often represents the most significant storage requirement.

It is therefore the object of the present invention to reduce the data storage requirement in digital filters of the type described.

SUMMARY OF THE INVENTION

In filters where the output sample rate can be lower than the input sample rate, only those output samples required are computed and storage is reduced by storing partial results of the convolution for the reduced number of output samples and completing partial results as the current input samples are received thereby providing the corresponding output samples. Thus no storage is required for the input signal samples.

DESCRIPTION OF THE PREFERRED EMBODIMENT

Before discussing the preferred embodiment of the invention, it will be helpful to consider some details of the prior art arrangements. In the discussion following the term "finite impulse response" will be designated as FIR for convenience.

Figure 1:
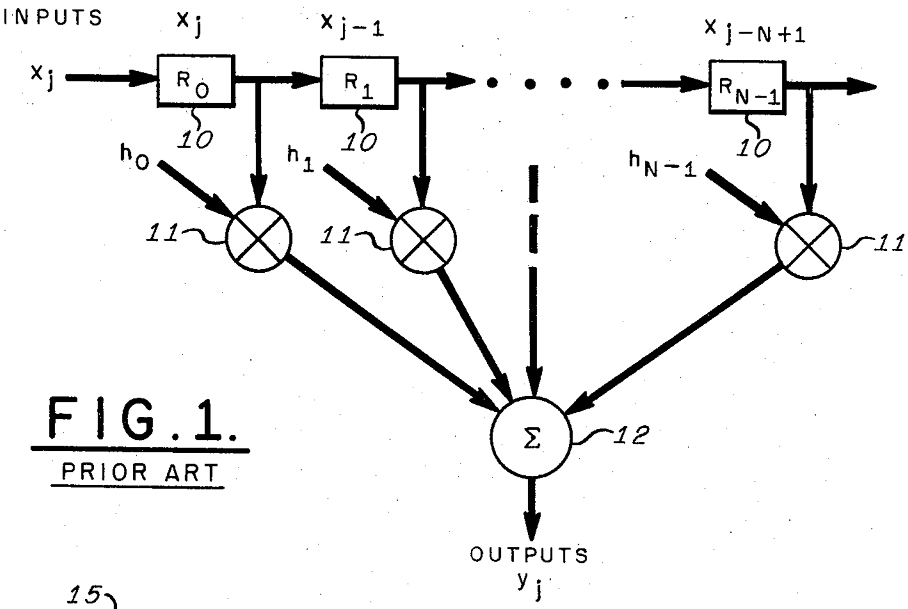
FIG. 1. PRIOR ART
FIG. 1 is a schematic block diagram of a prior art implementation for a finite impulse response transversal filter.

Conventionally FIR filters can be realized by direct application of the convolution equation:

$$y_j = \sum_{n=0}^{N-1} h_n x_{j-n} \quad j=0,1,2, \ldots ; \qquad (1)$$

where the $h_n$ are the impulse response coefficients of the filter, the $x_j$ represent successive inputs to the filter, and $y_j$ represents the $j^{th}$ output from the filter. The traditional means of implementing Equation (1) is illustrated in FIG. 1. Referring to FIG. 1, N storage registers 10 are utilized to hold N successive inputs, $x_j$ through $x_{j-N+1}$ where $N$ is the number of impulse response coefficients for the filter. The $N$ storage registers 10 in effect form a shift register. As each new input enters from the left, the contents of each of the storage registers 10 is shifted one register to the right to make room for the new input. The content of the rightmost storage register prior to a shift is lost when a shift occurs, so that the $N$ registers 10 always hold the $N$ most recent inputs. An output is generated after each new input is received, starting with all storage registers set to zero. The outputs are computed as follows:

TABLE 1

| Step | Input Sample | $R_0$ (Storage Registers for Input Samples) | $R_1$ | $R_2$ | ... | $R_{N-1}$ | Output |
|---|---|---|---|---|---|---|---|
| | | 0 | 0 | 0 | ... | 0 | |
| 0 | $X_0$ | $X_0$ | 0 | 0 | ... | 0 | |
| | | $(h_0X_0)$ → | | | | | $y_0$ |
| 1 | $x_1$ | $x_1$ | $x_0$ | 0 | ... | 0 | |
| | | $(h_0x_1+h_1x_0)$ → | | | | | $y_1$ |
| 2 | $x_2$ | $x_2$ | $x_1$ | $x_0$ | ... | 0 | |
| | | $(h_0x_2+h_1x_1+h_2x_0)$ → | | | | | $y_2$ |
| . | . | . | . | . | | . | . |
| . | . | . | . | . | | . | . |
| . | . | . | . | . | | . | . |
| N−1 | $x_{N-1}$ | $x_{N-1}$ | $x_{N-2}$ | $x_{N-3}$ | ... | $x_0$ | |
| | | $(h_0x_{N-1}+h_1x_{n-2}+...+h_{N-1}x_0)$ → | | | | | $y_{N-1}$ |
| N | $x_N$ | $x_N$ | $x_{N-1}$ | $x_{N-2}$ | ... | $x_1$ | |
| | | $(h_0x_N+h_1x_{N-1}+...+h_{N-1}x_1)$ → | | | | | $y_N$ |
| N+1 | $x_{N+1}$ | $x_{N+1}$ | $x_N$ | $x_{N-1}$ | ... | $x_2$ | |
| | | $(h_0x_{N+1}+h_1x_N+...+h_{N-1}x_2)$ → | | | | | $y_{N+1}$ |
| . | . | . | . | . | | . | . |
| . | . | . | . | . | | . | . |
| . | . | . | . | . | | . | . |

In Table 1 the contents of the N input sample storage registers 10, $R_0$ through $R_{N-1}$ are shown for several successive steps. The input sample in register $R_i$ is multiplied in a multiplier 11 by the impulse response coefficient $h_i$ associated with that register, and the products are summed at 12 to produce an output. The products for a particular output can be computed one at a time (serially) or simultaneously (in parallel). A block diagram for a FIR filter which is general as to the mode of operation is shown in FIG. 2.

Figure 2:
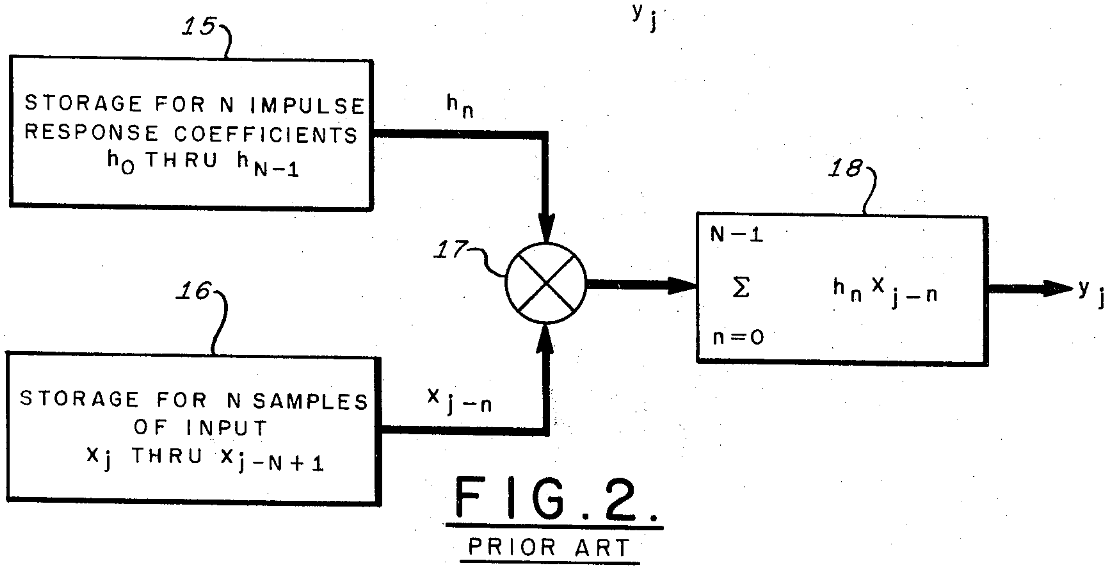
FIG. 2. PRIOR ART
FIG. 2 is a schematic block diagram of a generalized implementation of the filter of FIG. 1.

Referring to FIG. 2, the N impulse response coefficients are stored in a memory 15 and the N most recent input samples are stored in a memory 16. Following each input, N multiplications (serial or parallel) are performed at 17 and the products summed at 18 to produce an output. A total of 2N memory registers is required, N for storage of the input samples and N for storage of the impulse response coefficients.

Where the filter is used for bandwidth reduction, the output sample rate can generally be lower than the input sample rate. In contrast with recursive filters as previously discussed, a memory speed and computational speed saving proportional to the ratio of input to output sample rates can be achieved with the realizations of FIGS. 1 and 2 simply by computing only the output samples required. For very narrowband filters (and large sample rate reductions) the filter impulse response, and therefore also the storage required for the input data, can become very large. Since the impulse response coefficients can be stored in read-only memory and time shared for filtering of a number of different signals, the input signal storage then represents the most significant storage requirement. In accordance with the present invention, the data storage requirement is reduced by storing partial results rather than input signal samples.

The principle by which the present invention leads to a reduction in storage requirements when the output sample rate is lower than the input sample rate will be appreciated by firstly assuming that input and output sample rates are equal. No advantage is obtained in this case but the principle becomes clear. According to Equation (1) above each input sample, $X_j$, appears in output samples $y_j$ through $y_{j+N-1}$. Therefore, in accordance with the invention partial convolution results for outputs $y_j$ through $y_{j+N-1}$ are stored in memory storage registers rather than $N$ successive input samples. As an input sample, $x_j$, becomes available, it is multiplied by the impulse response coefficients $h_0$ through $h_{N-1}$. Each of the products formed is added to the appropriate storage register and the new partial result stored back in memory. Multiplication of the input sample by impulse response coefficients will be referred to as a multiplier cycle and updating of the storage registers holding the partial results will be referred to as a storage cycle.

The computations performed in using storage registers for accumulating partial convolution results are as follows:

TABLE 2

| Step | Input Sample | $R_0$ (Storage Registers) | $R_1$ | $R_2$ | ... | $R_{N-1}$ | Output |
|---|---|---|---|---|---|---|---|
| | | 0 | 0 | 0 | | 0 | |
| 0 | $x_0$ | $h_0x_0$ (+0) → | $h_1x_0$ | $h_2x_0$ | ... | $h_{N-1}x_0$ | $y_0$ |
| 1 | $x_1$ | $h_{N-1}x_1$ | $h_0x_1$ (+0) → | $h_1x_1$ | ... | $h_{N-2}x_1$ | $y_1$ |
| 2 | $x_2$ | $h_{N-2}x_2$ | $h_{N-1}x_2$ | $h_0x_2$ (+0) → | ... | $h_{N-3}x_2$ | $y_2$ |
| . | . | . | . | . | | . | . |

TABLE 2 -Continued

| Step | Input Sample | Storage Registers $R_0$ | $R_1$ | $R_2$ | ... | $R_{N-1}$ | Output |
|---|---|---|---|---|---|---|---|
| . | . | . | . | . | | . | . |
| . | . | . | . | . | | . | . |
| N−1 | $x_{N-1}$ | $h_1x_{N-1}$ | $h_2x_{N-1}$ | $h_3x_{N-1}$ | ... | $h_0x_{N-1}$ 0 | → $y_{N-1}$ |
| N | $x_N$ | $h_0x_N$ 0 | $h_1x_N$ | $h_2x_N$ | ... | $h_{N-1}x_N$ | → $y_N$ |
| N+1 | $x_{N+1}$ | $h_{N-1}x_{N+1}$ | $h_0x_{N+1}$ 0 | $h_1x_{N+1}$ | ... | $h_{N-2}x_{N+1}$ | → $y_N$ |
| . | . | . | . | . | | . | . |
| . | . | . | . | . | | . | . |
| . | . | . | . | . | | . | . |

As indicated in Table 2 a total of N registers $R_0$ through $R_{N-1}$ is used to accumulate results. Initially all registers are set to zero. Following the first input, $x_0$, a multiplier cycle and a storage cycle occur as further indicated in Table 2. The product $h_0x_0$ is added to accumulator $R_0$, the product $h_1x_0$ is added to accumulator $R_1$, and so forth, with $h_{N-1}x_0$ being added to $R_{N-1}$. The output $y_0$ is extracted from $R_0$ and $R_0$ set again to zero. Following the second input, $x_1$, the product $h_{N-1}x_1$ is added to $R_0$, the product $h_0x_1$ is added to $R_1$, and so forth, with $h_{N-2}x_1$ being added to $R_{N-1}$. The output $y_1$ is extracted from $R_1$ and $R_1$ set again to zero. The procedure continues in this manner. In other words, each register accumulates entries until it contains an output result $y_j$. It is then set to zero and accumulates again until output $y_{j+N}$ is obtained. It is again set to zero, accumulates further, etc. As each new input sample becomes available, a multiplier cycle and a storage cycle occur, and an output sample is obtained. The output sample always comes from the register that contains the product of $h_0$ and the most recent input sample.

The operation of successive multiplier and storage cycles is also indicated in Table 2. Note that if, following input $x_j$, the product $h_ix_j$ is added to $R_0$, then the product $h_{i+1}x_j$ is added to $R_1$, the product $h_{i+2}x_j$ is added to $R_2$, and so forth, with subscripts computed modulo N. Note also that if, following input $x_j$, the product $h_ix_j$ is added to $R_0$, then following input $x_{j+1}$, the product $h_{i-1}x_{j+1}$ is added to $R_0$, the product $h_ix_{j+1}$ is added to $R_1$ and so forth.

Two additional points are important. Firstly, while only one input sample is required at any time, a total of N storage registers is required for accumulating partial results and N registers are required for the filter impulse response coefficients. So no saving in storage is obtained when the input and output sample rates are equal. Secondly, at each step the accumulated results could be stored back into different registers from whence they came. By precessing the accumulated results properly, the output sample would always be available from the same register, say $R_0$. This precession may be convenient in some applications.

The computational procedures of Table 2 offer significant advantage when the output sample rate is less than the input sample rate. Assume the output rate is 1/J times the input rate, where N/J is an integer. Only every $J^{th}$ output result is needed and only N/J storage registers are required for accumulating results. The multiplication rate is also decreased by the factor J.

The computations performed in using storage registers for accumulating partial results in the sample rate reduction case are as follows:

TABLE 3

| Step | Input Sample | Storage Registers $R_0$ | $R_1$ | $R_2$ | ... | $R_{(N/J)-1}$ | Output |
|---|---|---|---|---|---|---|---|
| | | 0 | 0 | 0 | ... | 0 | |
| 0 | $x_0$ | $h_0x_0$ 0 | $h_Jx_0$ | $h_{2J}x_0$ | ... | $h_{N-J}x_0$ | → $z_0=y_0$ |
| 1 | $x_1$ | $h_{N-1}x_1$ | $h_{J-1}x_1$ | $h_{2J-1}x_1$ | ... | $h_{N-J-1}x_1$ | |
| 2 | $x_2$ | $h_{N-2}x_2$ | $h_{J-2}x_2$ | $h_{2J-2}x_2$ | ... | $h_{N-J-2}x_2$ | |
| . | . | . | . | . | | . | |
| . | . | . | . | . | | . | |
| . | . | . | . | . | | . | |
| J−1 | $x_{J-1}$ | $h_{N-J+1}x_{J-1}$ | $h_1x_{J-1}$ | $h_{J+1}x_{J-1}$ | ... | $h_{N-2J+1}x_{J-1}$ | |
| J | $x_J$ | $h_{N-J}x_J$ | $h_0x_J$ 0 | $h_Jx_J$ | ... | $h_{N-2J}x_J$ | → $z_1=y_J$ |
| J+1 | $x_{J+1}$ | $h_{N-J-1}x_{J+1}$ | $h_{N-1}x_{J+1}$ | $h_{J-1}x_{J+1}$ | ... | $h_{N-2J-1}x_{J+1}$ | |
| . | . | . | . | . | | . | |
| . | . | . | . | . | | . | |
| . | . | . | . | . | | . | |

As indicated in Table 3, each new input sample is followed by a multiplier cycle in which the input is multiplied by N/J of the impulse response coefficients and a storage cycle involving the N/J storage registers. In this case, the subscripts of the impulse response coefficients required for each multiplier cycle differ by multiples of the sample rate reduction factor, J, rather than by unity as before. That is, suppose $h_i$ is the impulse response coefficient which multiplies input sample $x_j$ at the $j^{th}$ step, following which the product is added to register $R_0$. Then $h_{i+J}$ multiplies $x_j$ and the product is added to register $R_1$, $h_{i+2J}$ multiplies $x_j$ and the product is added to register $R_2$, etc., where all subscripts are computed modulo N. Furthermore, during the next multiplier cycle, $h_{i-1}$ multiplies $x_{j+1}$ and the product is added to $R_0$, $h_{i-1+J}$ multiplies $x_{J+1}$ and the product is added to $R_1$, etc.

The first output, $z_0$ ($z_0=y_0$), is obtained after the first input sample, $x_0$, has been received. Thereafter an output is obtained following each multiple of J inputs ($z_k=y_{kJ}$ $k=0,1,2,\ldots$). Generally, every $J^{th}$ output can be obtained by starting with any $y_i$, $0 \leq i < J$, and then computing every $J^{th}$ output $$z_k=y_{i+kJ}\ 0 \leq i < J, k=0, 1 \ldots$$

The register that contains the output sample is set to zero and the procedure continues. The output sample always comes from the register that contains the product of $h_0$ and the most recent input sample. After each output, the accumulated results could be stored back into different registers from whence they came. By precessing the accumulated results properly, the output sample could always be available from the same register, say $R_0$. Again, this precession may be convenient in some applications.

The use of storage registers for accumulating partial results requires, in the sample rate reduction case, a total of N/J storage registers for partial results and N registers for the filter impulse response coefficients, for a total of N(1+1/J) storage registers. This represents a savings of 2N−N(1+1/J)= N(1−1/J) storage registers over the traditional implementation of FIR filters shown in FIGS. 1 and 2. Additional savings in storage for the impulse response coefficients may be possible if the coefficients exhibit symmetry.

Figure 3:
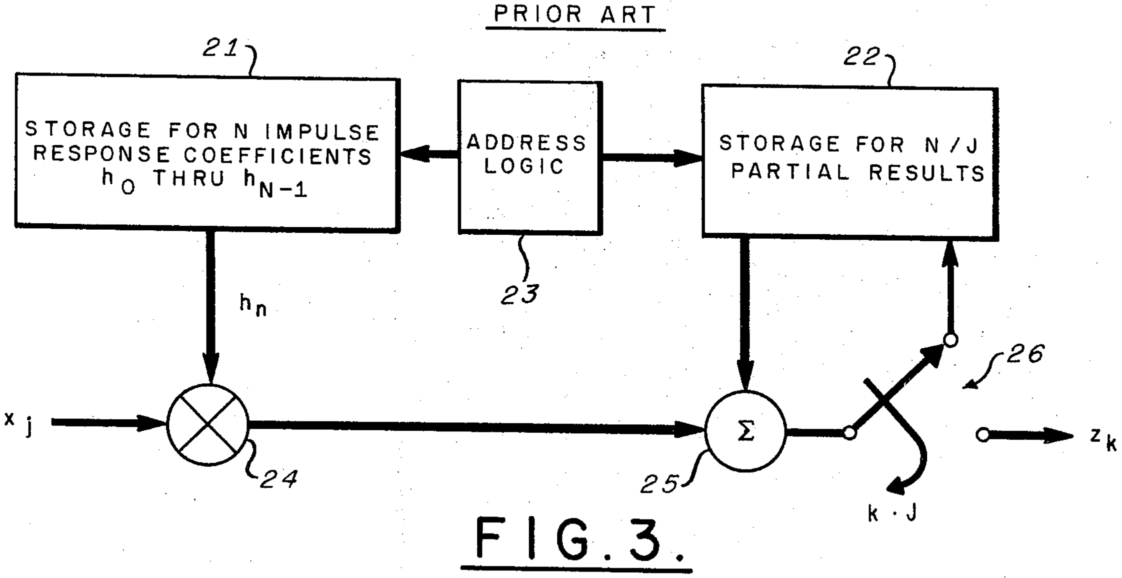
FIG. 3 is a schematic block diagram of a generalized implementation of a finite impulse response filter in accordance with the invention.

A generalized block diagram for a FIR filter which implements the convolution equation (1) by partial sums is shown in FIG. 3. Referring to FIG. 3, the N impulse response coefficients are stored in a memory 21 and the N/J partial sums are stored in a memory 22. Address logic 23 controls the selection of impulse response coefficients for each multiplier cycle (schematically illustrated at 24) and the updating of the partial sums (schematically illustrated at 25) where the multiplications may be done either serially or in parallel. An output $z_k$ is obtained after every multiple of J inputs as illustrated schematically by a closure of a switch 26 to the output line.

If the length, N, of the filter impulse response is not a multiple of the sample rate reduction factor, J, then the number of storage registers required for accumulating partial results is given by the least integer greater than N/J. In this case, operation of the filter may be visualized as follows: zeros are added to the sequence of N impulse response coefficients so that an augmented impulse response of length N' = N+J−M is obtained (where M=N (modulo J)) which is divisible by J. The operation of the filter proceeds as described for the case when N/J is an integer, except using the augmented impulse response, with N replaced by N'. In practice, it is not necessary to store the added zero coefficients nor is it necessary to perform multiplication of input samples by the zero coefficients. Thus N storage registers are required for the original impulse response coefficients and N'/J storage registers for partial results when N/J is not an integer. The savings in storage registers over the traditional implementation of FIR filters discussed above with regard to FIG. 1 is now 2N − N+(N'/J) = N−(N'/J).

Figure 4:
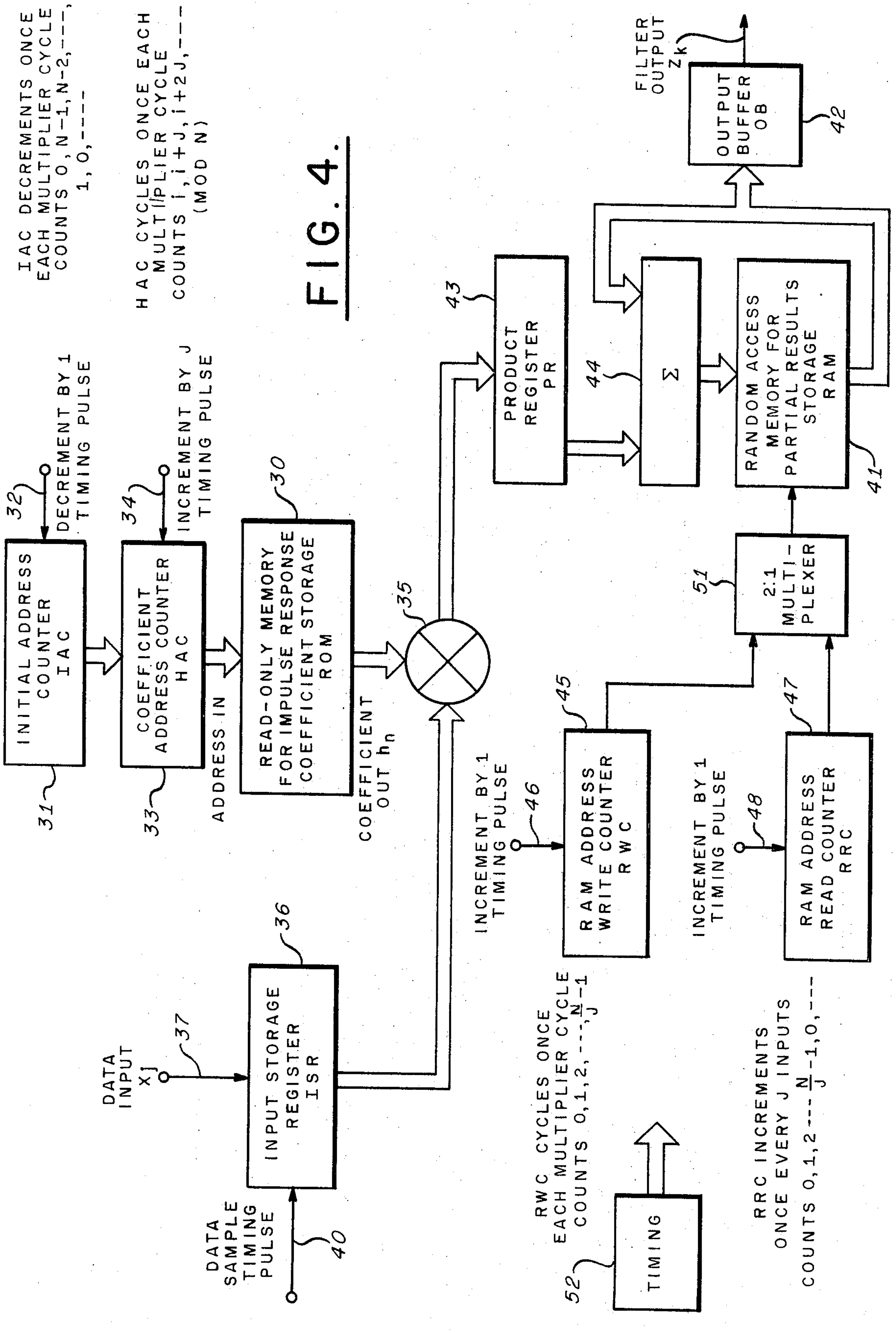
FIG. 4 is a schematic block diagram of a specific embodiment of the invention.

Referring now to FIG. 4 a specific instrumentation of an FIR digital filter embodying the above described concepts of the invention is illustrated.

This specific embodiment of the invention comprises a filter which has N impulse response coefficients, $h_0, \ldots, h_{N-1}$. The sample rate reduction factor is taken as J, and N/J is assumed to be an integer. This implementation is a mixed serialparallel configuration, serial in that the impulse response coefficients are presented sequentially for multiplication by the current input data sample during a multiplier cycle, but parallel in that each multiplication is performed in parallel on the bits of the multiplier and multiplicand.

The digital filter of FIG. 4 includes a read-only memory (ROM) 30 which provides storage for the N filter impulse response coefficients $h_0 \ldots h_{N-1}$ at locations (i.e., at addresses) 0 through N−1.

Associated with the memory 30 is an initial address counter (IAC) 31. The counter 31 provides the address of the first filter impulse response coefficient used in each multiplier cycle. Following the start of a multiplier cycle, and prior to the start of the next multiplier cycle, the counter 31 is decremented by 1 in response to a timing pulse on an input lead 32. The counter 30 counts in modulo N fashion in response to the timing pulses on the lead 32.

The output of the counter 31 provides the input to a coefficient address counter (HAC) 33 which in turn provides its output to the memory 30. The counter 33 provides the addresses, in a sequential fashion, of the N/J filter impulse response coefficients used in a multiplier cycle starting with the address provided by the initial address counter 31. Following each coefficient address supplied to the memory 30 during a multiplier cycle, the counter 33 is incremented by J by signals applied to a lead 34. The counter 33 counts in modulo N fashion in response to the timing pulses provided on the lead 34.

The impulse response coefficients read out from the memory 30 are provided as an input to a parallel multiplier 35. The other input to the parallel multiplier 35 is provided from an input storage register (ISR) 36. The input storage register 36 provides storage for the most recent input sample from a lead 37 strobed into the register 36 from a data sample timing pulse on a lead 40. The register 36 provides storage for the current input sample during the multiplier cycle that follows receipt of that sample.

The digital filter of FIG. 4 also includes a random access memory (RAM) 41. The memory 41 provides storage for the N/J partial sums and possesses the well known capabilities for accessing, updating and restoring. The output of the memory 41 is provided as an input to an output buffer register (OB) 42 which provides temporary storage for the most recent filter output $z_k$.

The output of the multiplier 35 is provided as an input to a product register (PR) 43. The product register 43 provides storage for successive products from the multiplier 35 of the current sample from the register 36 with the filter impulse response coefficients from the memory 30 during a multiplier cycle. Only one such product is stored in the register 43 at any time pending the updating of the appropriate partial sum in the random access memory 41.

The output from the product register 43 as well as the output from the memory 41 provides the inputs to a conventional parallel adder 44. The output from the parallel adder 44 provides the input to the random access memory 41.

An address write counter (RWC) 45 controls updating of the partial sums stored in the memory 41. The counter 45 provides addresses, in a sequential fashion, of the N/J partial sums stored in the memory 41 for updating during each multiplier cycle. The counter 45 is timed so that a partial sum is available for updating at the inputs to the adder 44 every time the product register 43 is loaded. Subsequent to each partial sum address supplied to the memory 41 during a multiplier cycle, the counter 45 is incremented by unity in response to a timing pulse on a lead 46. The counter 45 counts in modulo N/J fashion in response to the timing pulses on the lead 46.

An address read counter (RRC) 47 provides successive addresses of partial sums corresponding to successive outputs $z_k$ from the filter. In the embodiment of FIG. 4, the outputs $z_k$ occur in the same order as illustrated in Table 3 above, i.e., following the first data input and thereafter following every J data inputs. After a partial sum is provided for output from the filter, i.e. transferred to the output buffer 42, that partial sum is reset to zero in the memory 41. The address read counter 47 is incremented by unity in response to a timing pulse on a lead 48 following the first input and thereafter following every J inputs. The counter 47 counts in modulo N/J fashion in response to the timing pulses on the lead 48.

The outputs from the counters 45 and 47 provide inputs to a 2:1 multiplexer 51 having two inputs and one output. The address signals from the counters 45 and 47 pass through the multiplexer 51 to control the operation of the memory 41.

The operation of the filter of FIG. 4 is controlled by timing circuits 52 which are connected to the aforedescribed blocks thereof to provide timing signals. The timing connections from the block 52 to the remaining blocks of the figure are not shown for simplicity of drawing. The timing circuits 52 provide a periodic sequence of pulses with period J times the interval between successive input samples. A representative portion of this sequence of timing signals is illustrated in FIG. 5.

Figure 5:
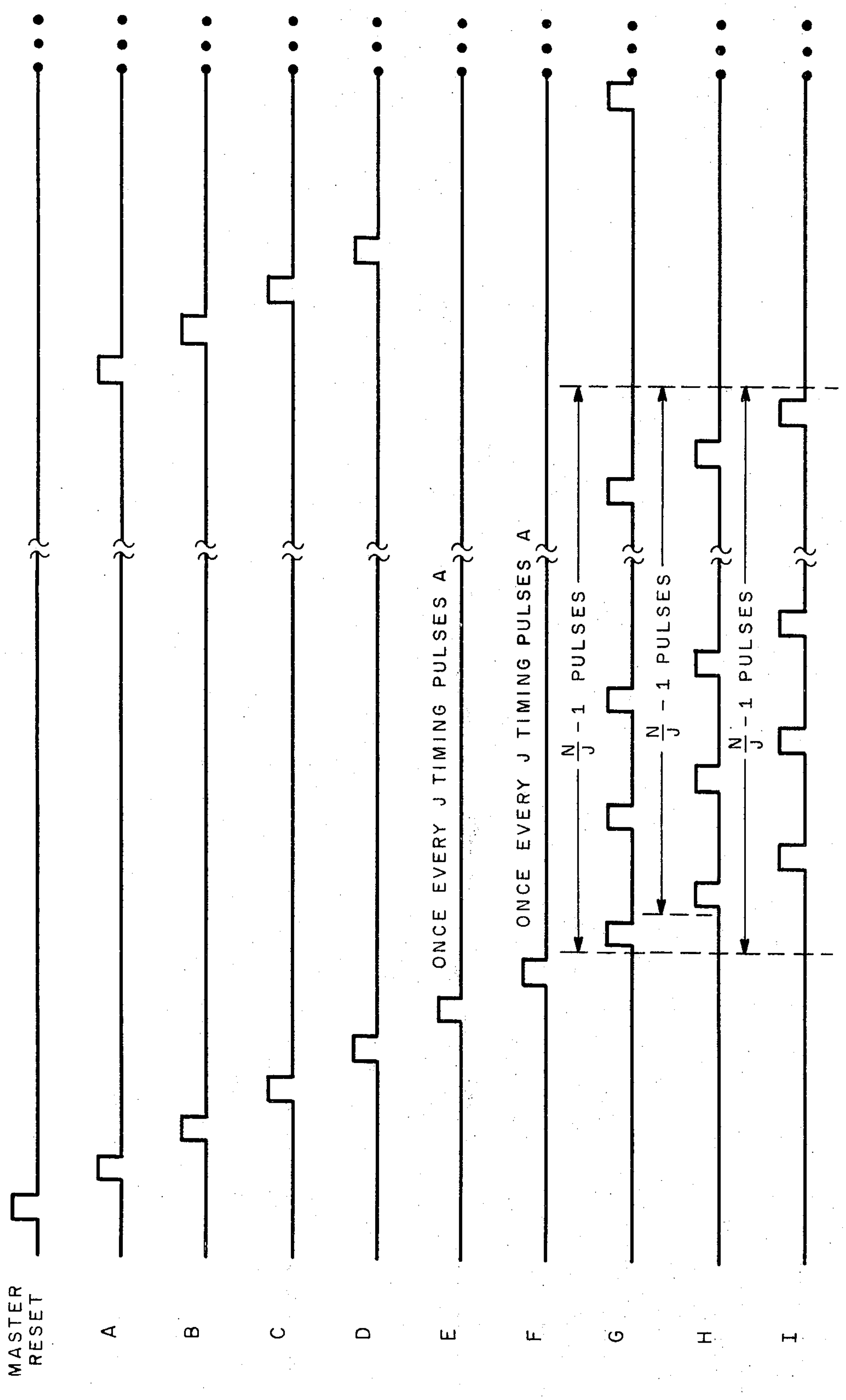
FIG. 5 is a waveform timing diagram showing timing signals utilized in the embodiment of FIG. 4.

Referring to FIGS. 4 and 5, a specific set of operations of the apparatus of FIG. 4 is performed upon receipt of each of the timing pulses in the sequence of FIG. 5. A convention to be utilized hereinafter for convenience is the use of ( ) to denote "contents of." Thus (A) denotes "contents of A" where A is any register, counter, etc. Additionally, $(RAM)^A$ denotes the contents of the RAM at the address specified by the contents of register A. Operation is initiated with the master reset pulse followed by timing pulses A through I as illustrated in FIG. 5.

The operation of the apparatus of FIG. 4 in response to the timing pulses occurs as follows:

Master Reset: reset all registers and counters except for ROM

A: load ISR and load HAC from IAC

B: load PR from multiplier 35, increment HAC by J, and decrement IAC by 1

C: load RAM at address specified by (RWC) with $(PR)+(RAM)^{RWC}$

D: increment RWC by 1

E: load OB with $(RAM)^{RRC}$

F: increment RRC by 1

G: load PR from multiplier 35 and increment HAC by J

H: load RAM at address specified by (RWC) with $(PR)+(RAM)^{RWC}$

I: increment RWC by 1

After (N/J)−1 of the timing pulses I have occurred, the above sequence repeats starting with timing pulse A. Note, however, that timing pulses E and F occur only once every J of the timing pulses A.

It will be appreciated that each of the above described operations are individually well known procedures in the data processing art and will not be further explained in greater detail for simplicity of drawing and brevity of description.

It will be appreciated that the above filter has been described in general terms without regard to specific filter characteristics. A specific filter is designed in accordance with the invention by selecting the specific impulse response coefficients required to provide the desired filter characteristics and storing the coefficients in the memory 30 for use in the manner described above.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A digital filter comprising input means for receiving input digital signals representative of sequential samples of an analog waveform to be filtered, first storage means for storing digital samples of the impulse response of said filter, convolution means coupled to said input means and said first storage means for computing the discrete partial convolution of each current input sample with respect to said impulse response samples, second storage means included in said convolution means for simultaneously storing a plurality of the results of said partial convolution computations, and output means coupled to said second storage means for providing output digital signals representative of those of said plurality of partial convolution results completed by inclusion of a current input sample, thereby providing said output digital signals representative of said filtered analog waveform.

2. The digital filter of claim 1 further including means for resetting said completed partial results to zero after being provided to said output means.

3. The digital filter of claim 1 in which said convolution means further includes multiplier means coupled to said input means and said first storage means for multiplying each current input sample with said impulse response samples providing products thereof, respectively, and summation means coupled to said multiplier means and said second storage means for adding said products to said partial convolution results, respectively, thereby providing partial convolution results updated with respect to said current input sample.

4. The digital filter of claim 3 in which said second storage means comprises a second memory with an input coupled to the output of said summation means and with an output coupled to an input of said summation means, and control counter means coupled to said second memory for controlling the storage and updating of said partial convolution results.

5. The digital filter of claim 3 in which said first storage means comprises a first memory for storing said digital samples of said impulse response, and address counter means coupled to said first memory for controlling the sequential readout of every $J^{th}$ impulse response sample, with J greater than unity.

6. The digital filter of claim 5 in which said address counter means comprises a coefficient address counter coupled to said first memory for controlling the sequential readout of every $J^{th}$ impulse response sample, and an initial address counter coupled to said coefficient address counter for controlling the initial address for each said sequential readout.

* * * * *